United States Patent
Zhou et al.

(10) Patent No.: US 10,968,810 B2
(45) Date of Patent: Apr. 6, 2021

(54) THERMAL MANAGEMENT MODULE

(71) Applicants: Huilan Zhou, Taicang (CN); Uli Großkopf, Adelsdorf (DE)

(72) Inventors: Huilan Zhou, Taicang (CN); Uli Großkopf, Adelsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 136 days.

(21) Appl. No.: 16/310,014

(22) PCT Filed: Apr. 12, 2017

(86) PCT No.: PCT/CN2017/080214
§ 371 (c)(1),
(2) Date: Jul. 24, 2019

(87) PCT Pub. No.: WO2018/000893
PCT Pub. Date: Jan. 4, 2018

(65) Prior Publication Data
US 2019/0353085 A1    Nov. 21, 2019

(30) Foreign Application Priority Data
Jun. 27, 2016    (CN) .......................... 201610479998.7

(51) Int. Cl.
*F01P 7/14*    (2006.01)
*F04D 29/40*    (2006.01)
(Continued)

(52) U.S. Cl.
CPC ................ *F01P 7/14* (2013.01); *F01P 3/18* (2013.01); *F01P 5/12* (2013.01); *F04D 29/406* (2013.01);
(Continued)

(58) Field of Classification Search
CPC ........ F01P 7/014; F01P 2007/146; F01P 3/18; F01P 5/12; F04D 29/406; F04D 13/024; F04D 29/046; F04D 29/22; F04D 29/106
(Continued)

(56) References Cited

U.S. PATENT DOCUMENTS

| 4,573,344 A | 3/1986 | Ezekoye |
| 5,338,153 A * | 8/1994 | Swanson ............... F04D 29/126 415/168.2 |

(Continued)

FOREIGN PATENT DOCUMENTS

| CN | 101245865 A | 8/2008 |
| CN | 101802469 A | 8/2010 |

(Continued)

*Primary Examiner* — Syed O Hasan
(74) *Attorney, Agent, or Firm* — Matthew Evans (57) ABSTRACT

A thermal management module comprises a housing and a drive shaft located within the housing. The housing is provided with a first internal cavity, a partition and a second internal cavity which are arranged in series along the axial direction of the drive shaft. The first internal cavity and the second internal cavity are separated by the partition. The partition is proved with a through-hole through which the drive shaft passes. One end of the drive shaft extends into the first internal cavity. A second internal cavity is used for receiving a drivetrain for rotating the drive shaft.

17 Claims, 4 Drawing Sheets

(51) Int. Cl.
*F01P 5/12* (2006.01)
*F01P 3/18* (2006.01)
*F04D 13/02* (2006.01)
*F04D 29/22* (2006.01)
*F04D 29/10* (2006.01)
*F04D 29/046* (2006.01)

(52) U.S. Cl.
CPC ...... *F01P 2007/146* (2013.01); *F04D 13/024* (2013.01); *F04D 29/046* (2013.01); *F04D 29/106* (2013.01); *F04D 29/22* (2013.01)

(58) Field of Classification Search
USPC .................................................. 123/41.08
See application file for complete search history.

(56) References Cited

U.S. PATENT DOCUMENTS

| | | | |
|---|---|---|---|
| 6,568,428 B2 | 5/2003 | Pecci et al. | |
| 2004/0129912 A1 | 7/2004 | Promper | |
| 2008/0112792 A1* | 5/2008 | Hotta | F04D 29/126 |
| | | | 415/109 |
| 2012/0134789 A1* | 5/2012 | Murakami | F04D 13/02 |
| | | | 415/182.1 |
| 2016/0010535 A1 | 1/2016 | Lee | |
| 2016/0333891 A1* | 11/2016 | Koga | F04D 29/146 |
| 2017/0108002 A1* | 4/2017 | Osawa | F04D 29/22 |

FOREIGN PATENT DOCUMENTS

| | | |
|---|---|---|
| CN | 103890434 A | 6/2014 |
| CN | 104847893 A | 8/2015 |
| CN | 105275576 A | 1/2016 |
| CN | 105408671 A | 3/2016 |
| CN | 205154359 U | 4/2016 |
| GB | 2160662 A | 12/1985 |
| WO | 0057987 A1 | 10/2000 |

* cited by examiner

THERMAL MANAGEMENT MODULE

The present application claims the priority of Chinese patent application no. 201610479998.7 with invention title "Thermal management module", submitted to the Chinese Patent Office on Jun. 27, 2016, the entire contents of which are incorporated herein by reference.

TECHNICAL FIELD

The present invention relates to the technical field of cooling systems, in particular to a thermal management module (abbreviated as TMM).

BACKGROUND

An engine cooling system on an existing motor vehicle is provided with a thermal management module mounted on the engine. The thermal management module can control the flow direction of coolant, so as to heat the engine when the engine temperature is low, and cool the engine when the engine temperature is high, so that the engine is kept operating at a suitable temperature at all times.

The thermal management module comprises a housing and a drive shaft located in the housing. The housing has a first internal cavity, a separating part and a second internal cavity arranged in sequence in the axial direction of the drive shaft. The first and second internal cavities are separated by the separating part. The separating part is provided with a through-hole for the drive shaft to pass through. One axial end of the drive shaft extends into the first internal cavity, so as to be connected to a valve body in the first internal cavity in a torsion-resistant manner; another axial end extends into the second internal cavity, so as to be connected to a drive apparatus in the second internal cavity. When the drive apparatus operates, it drives the drive shaft to rotate, and the drive shaft drives the valve body to rotate, to open a flow of coolant, cut off the flow of coolant, and control the flow direction of coolant.

The through-hole has first and second ports, wherein the first port faces toward the first internal cavity, the second port faces toward the second internal cavity, one axial end of the drive shaft extends into the first internal cavity from the first port, and the other axial end extends into the second internal cavity from the second port. The housing is provided with a leakage channel in communication with the atmosphere; an inlet of the leakage channel is disposed in a hole wall of the through-hole, and located between the first and second ports of the through-hole in the axial direction of the drive shaft. When coolant in the first internal cavity leaks out from the first port, the leaked coolant flows to the outside of the housing from the leakage channel, preventing the ingress of leaked coolant into the second internal cavity and consequent damage to the drive apparatus.

To prevent a user from seeing leaked coolant outside the housing, an existing thermal management module is additionally provided with a container, the container being disposed outside the housing and used for collecting leaked coolant. The container has a fixing support leg, which extends into the leakage channel of the housing and fits the leakage channel, to fix the container on the housing.

However, the existing thermal management module described above has the following shortcomings:

1. The container is disposed outside the housing, so the space occupied by the thermal management module is increased.

2. When the container is fixed to the housing, the fixing support leg of the container is easily broken, causing damage to the container.

3. The molding of the housing is already complex, and it is further necessary to provide a structure which fits the fixing support leg of the container, increasing the complexity of molding of the housing, and increasing the machining difficulty.

SUMMARY

The problems to be solved by the present invention are as follows: The container for collecting leaked coolant in the existing thermal management module is disposed outside the housing, so the space occupied by the thermal management module is increased. Furthermore, the container is easily damaged when being fixed to the housing, and the housing must be provided with a structure which fits the fixing support leg of the container, with the result that the complexity of molding of the housing is increased, and the machining difficulty is increased.

To solve the abovementioned problems, the present invention provides a thermal management module, comprising a housing and a drive shaft located in the housing, the housing having a first internal cavity, a separating part and a second internal cavity arranged in sequence in an axial direction of the drive shaft, the first and second internal cavities being separated by the separating part, the separating part being provided with a through-hole for the drive shaft to pass through, the through-hole having a first port facing toward the first internal cavity and a second port facing toward the second internal cavity, the drive shaft having one axial end extending from the first port into the first internal cavity, and another axial end extending from the second port into the second internal cavity, and the second internal cavity accommodating a drive apparatus for driving the drive shaft to rotate;

the housing is further provided with a collecting cavity, the collecting cavity having a collecting inlet provided in a hole wall of the through-hole, the collecting inlet being located between the first and second ports in the axial direction, and the collecting cavity being used for collecting, through the collecting inlet, coolant in the first internal cavity which leaks from the first port.

Optionally, the housing comprises first and second casings arranged in sequence in the axial direction, the first and second casings being in dismantlable fixed connection with each other;

the first internal cavity is disposed on the first casing, the second internal cavity is disposed on the second casing, the separating part comprises first and second end covers arranged opposite each other in the axial direction and enclosing the collecting cavity, the first end cover is located on the first casing, and located on one axial side of the first internal cavity, the second end cover is located on the second casing, and located on one axial side of the second internal cavity, the through-hole runs through the first and second end covers, the first port is disposed on the first end cover, and the second port is disposed on the second end cover.

Optionally, one of the first and second end covers is provided with a protruding boss on a surface facing the other end cover in the axial direction, the boss being in contact with the other end cover, so as to enclose the collecting cavity.

Optionally, there are two said bosses, spaced apart in the circumferential direction of the drive shaft.

Optionally, the boss is circularly arcuate.

Optionally, the collecting cavity has an outlet in communication with the atmosphere, the outlet allowing coolant in the collecting cavity to evaporate and be discharged.

Optionally, a seal is disposed at a position of contact between the first and second end covers, to prevent coolant in the collecting cavity from leaking from the position of contact.

Optionally, one of the first and second end covers is provided with a groove; a part of the seal is embedded in the groove, and another part protrudes from the groove, and forms a contact seal with the other end cover.

Optionally, the seal is a rubber member.

Optionally, the dismantlable fixed connection is a bolt connection.

Compared with the prior art, the technical solution of the present invention has the following advantages:

When coolant in the first internal cavity has leaked from the first port of the through-hole facing toward the first internal cavity, the coolant flows into the collecting cavity of the housing from the collecting inlet disposed in the hole wall of the through-hole and is stored in the collecting cavity. Hence, leaked coolant will not flow to the outside of the housing and be seen by a user, and will not flow into the second internal cavity from the second port of the through-hole facing toward the second internal cavity and damage the drive apparatus. Since the collecting cavity inside the housing has the function of collecting leaked coolant, there is no need for a special container for collecting leaked coolant to be provided outside the housing. In this way, not only is the space occupied by the thermal management module reduced, the problem of the container being easily damaged when being fixed to the housing is also avoided; furthermore, there is no need for the housing to be provided with a structure fitting a fixing support leg of a container, so the machining difficulty of the housing is reduced.

DETAILED DESCRIPTION

To enable the abovementioned object, features and advantages of the present invention to be more obvious and easier to understand, particular embodiments of the present invention are explained in detail below with reference to the accompanying drawings.

The present invention provides a thermal management module, capable of being used in various fields, so that an apparatus to be controlled is kept operating at a suitable temperature at all times. In this embodiment, the apparatus to be controlled is for example an engine on a motor vehicle, a gearbox, or a battery providing motive power for movement of a motor vehicle. In other embodiments, the apparatus to be controlled could also be used in technical fields other than the technical field of motor vehicles.

Figure 1:
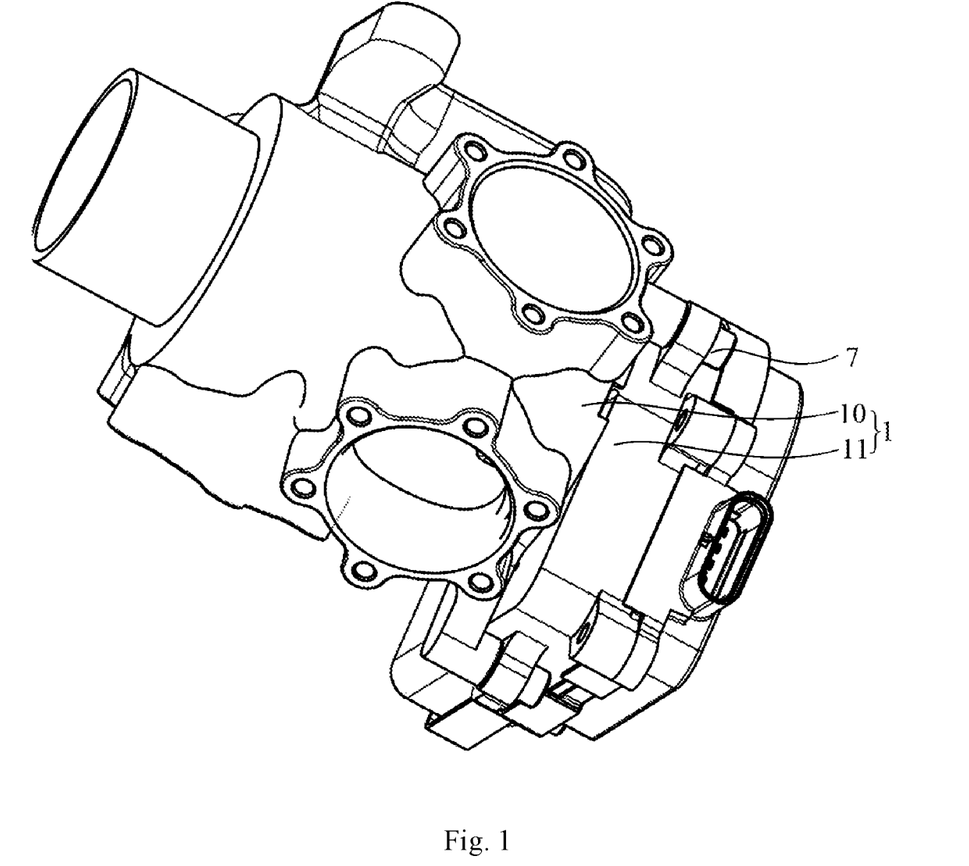
FIG. 1 is a three-dimensional drawing of a thermal management module in an embodiment of the present invention.
Figure 2:
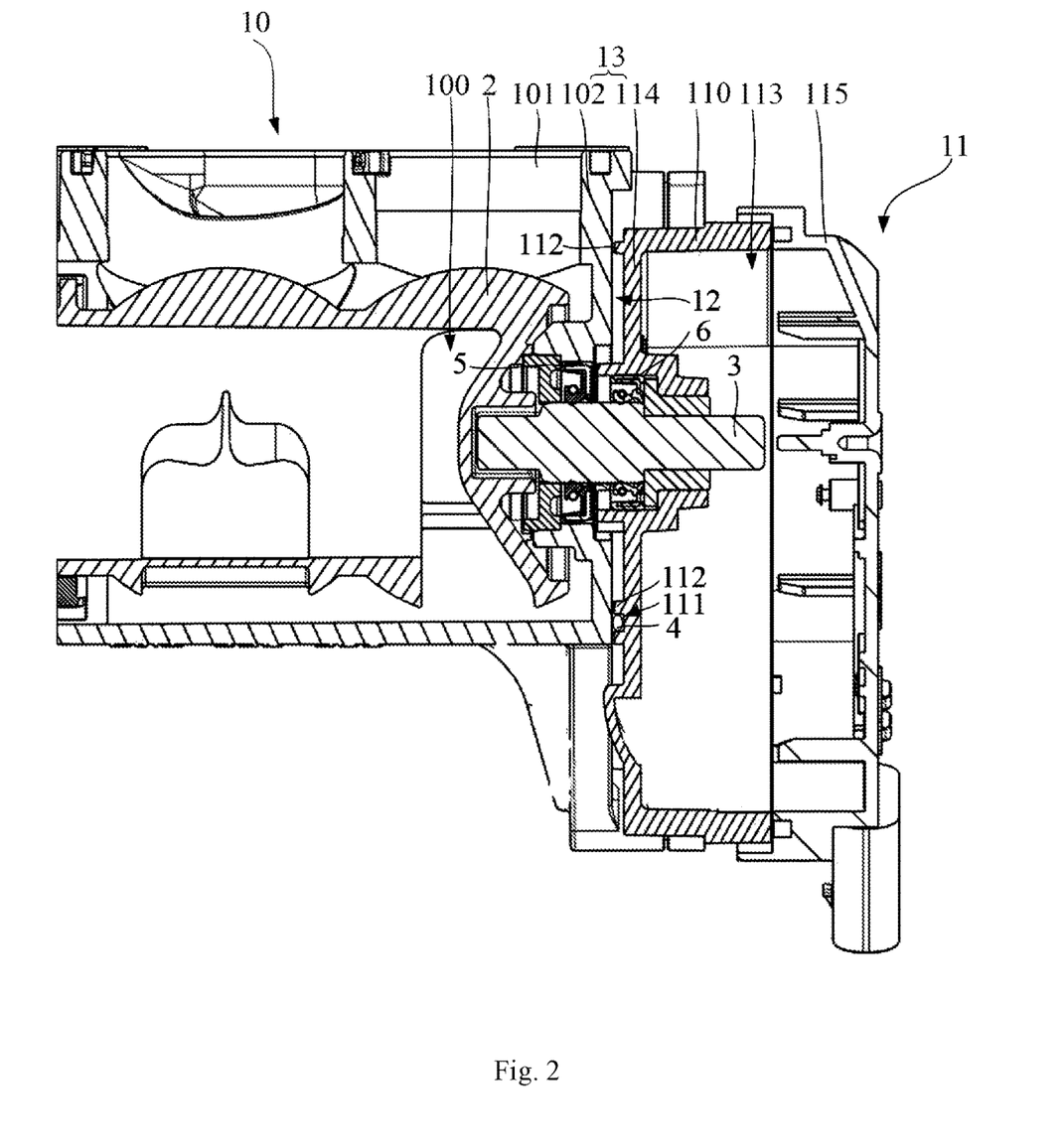
FIG. 2 is a sectional view of the thermal management module shown in FIG. 1, the sectional plane being a plane in which a central axis of the drive shaft lies.
Figure 3:
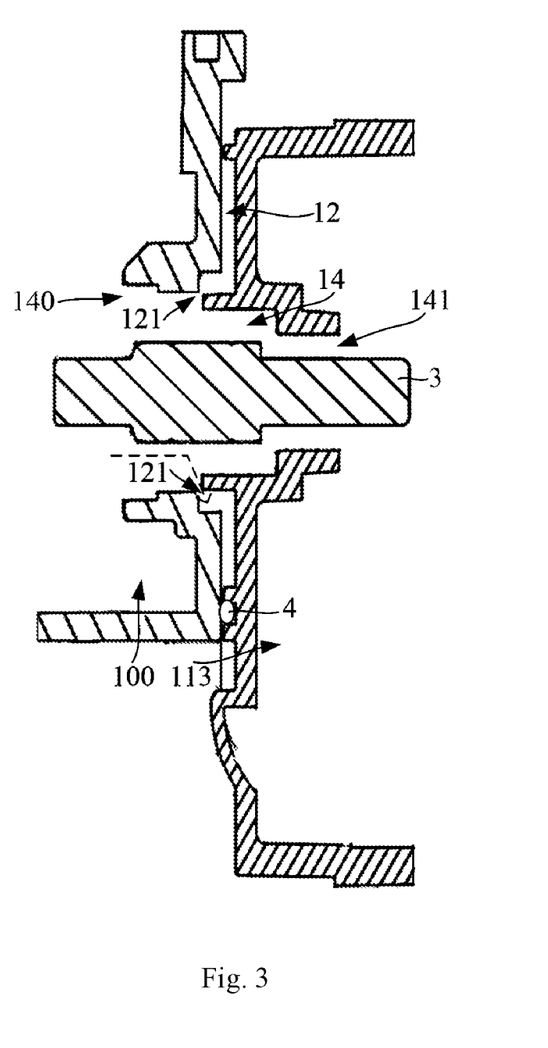
FIG. 3 is a schematic diagram of the relative positions of the collecting cavity and the through-hole on the housing in the thermal management module shown in FIG. 2; in the figure, the dotted-line arrow indicates a flow path of coolant in the first internal cavity.

As shown in FIGS. 1 to 3, the thermal management module in this embodiment comprises a housing 1 and a drive shaft 3 located in the housing 1. The housing 1 has a first internal cavity 100, a separating part 13 and a second internal cavity 113 arranged in sequence in the axial direction of the drive shaft 3. The first internal cavity 100 and second internal cavity 113 are separated by the separating part 13. The separating part 13 is provided with a through-hole 14 for the drive shaft 3 to pass through. The through-hole 14 has a first port 140 facing toward the first internal cavity 100, and a second port 141 facing toward the second internal cavity 113. One axial end of the drive shaft 3 extends into the first internal cavity 100 from the first port 140, so as to be connected to a valve body 2 in a torsion-resistant manner; another axial end of the drive shaft 3 extends into the second internal cavity 113 from the second port 141, so as to be connected to a drive apparatus (not shown) in the second internal cavity 113. When the drive apparatus operates, it drives the drive shaft 3 to rotate, and the valve body 2 can rotate under the driving action of the drive shaft 3. When rotating, the valve body 2 is used to open a flow of coolant, cut off the flow of coolant, and control the flow direction of coolant.

The housing 1 is further provided with a collecting cavity 12; the collecting cavity 12 has a collecting inlet 121 provided in a hole wall of the through-hole 14, the collecting inlet 121 being located between the first port 140 and the second port 141 of the through-hole 14 in the axial direction of the drive shaft 3. When coolant in the first internal cavity 100 has leaked from the first port 140 of the through-hole 14, the coolant will not flow into the second internal cavity 113 from the second port 141 of the through-hole 14, but will instead enter the collecting cavity 12 from the collecting inlet 121, and be stored in the collecting cavity 12. Hence, leaked coolant will not flow to the outside of the housing 1 and be seen by a user, and will not damage the drive apparatus as a result of flowing into the second internal cavity 113. Since the collecting cavity 12 inside the housing 1 has the function of collecting leaked coolant, there is no need for a special container for collecting leaked coolant to be provided outside the housing 1. In this way, not only is the space occupied by the thermal management module reduced, the problem of the container being easily damaged when being fixed to the housing is also avoided; furthermore, there is no need for the housing to be provided with a structure fitting a fixing support leg of a container, so the machining difficulty of the housing is reduced.

In this embodiment, the housing 1 comprises a first casing 10 and a second casing 11 which are arranged in sequence in the axial direction of the drive shaft 3; the first casing 10 and second casing 11 are in dismantlable fixed connection with each other. In the technical solution of the present invention, the term "dismantlable fixed connection" means that the connection between the first casing 10 and the second casing 11 can be released without damaging the first casing 10 and the second casing 11, to separate the first casing 10 and the second casing 11.

In this embodiment, the dismantlable fixed connection is a bolt connection, i.e. the first casing 10 and the second casing 11 are connected together in a fixed manner by means of bolts 7, such that the separation and fitting together of the first casing 10 and the second casing 11 is very convenient.

Of course, in other embodiments, the dismantlable fixed connection between the first casing 10 and the second casing 11 could also be achieved in other ways, e.g. by a snap-fit connection.

The first internal cavity 100 is disposed on the first casing 10, and the second internal cavity 113 is disposed on the second casing 11. The separating part 13 comprises a first end cover 102 and a second end cover 114, which are arranged opposite each other in the axial direction of the drive shaft 3 and enclose the collecting cavity 12. The first end cover 102 is located on the first casing 10, and located on one axial side of the first internal cavity 100. The second end cover 114 is located on the second casing 11, and located on one axial side of the second internal cavity 113. The through-hole 14 runs through the first end cover 102 and the second end cover 114. The first port 140 is disposed on the first end cover 102, and the second port 141 is disposed on the second end cover 114. The drive shaft 3 is rotatably supported on the first end cover 102 and the second end cover 114.

In the technical solution of this embodiment, the first casing 10 and the second casing 11 may be machined separately, then fitted together so that the first end cover 102 and the second end cover 114 enclose the collecting cavity 12, such that the machining of the housing 1 and the collecting cavity 12 is simpler. Of course, the housing 1 could also be integrally formed by precision machining.

In this embodiment, the first casing 10 further comprises a first hollow columnar part 101, having an axial end in fixed connection with the first end cover 102 and enclosing the first internal cavity 100. The second casing 11 further comprises a second hollow columnar part 110, having one axial end in fixed connection with the second end cover 114, and another axial end in fixed connection with a third end cover 115. The second hollow columnar part 110, the second end cover 114 and the third end cover 115 enclose the second internal cavity 113.

As shown in FIG. 2, in this embodiment, a seal 4 is disposed at a position of contact between the first end cover 102 and the second end cover 114, the seal 4 being capable of preventing coolant in the collecting cavity 12 from leaking from the position of contact. In this way, even if a minute gap exists at the position of contact between the first end cover 102 and the second end cover 114 due to machining error, the sealing action of the seal 4 can prevent coolant in the collecting cavity 12 from leaking from the gap to the outside of the housing 1, reducing the possibility of coolant in the collecting cavity 12 leaking to the outside of the housing 1.

In this embodiment, the seal 4 is a rubber member, which deforms under the squeezing action of the first end cover 102 and the second end cover 114, and forms a contact seal with the first end cover 102 and the second end cover 114. It must be explained that in the technical solution of the present invention, the structure of the seal 4 should not be restricted to the embodiment given.

In this embodiment, the second end cover 114 is provided with a groove 111; a part of the seal 4 is embedded in the groove 111, and another part protrudes from the groove 111, and forms a contact seal with the first end cover 102. When the thermal management module is assembled, the seal 4 is fixed on the second end cover 114 first, then the second casing 11 is connected to the first casing 10 in a fixed, dismantlable manner.

In a variation of this embodiment, the groove 111 is disposed on the first end cover 102, and the seal 4 mounted in the groove 111 forms a contact seal with the second end cover 114. When the thermal management module is assembled, the seal 4 is fixed on the first end cover 102 first, then the first casing 10 is connected to the second casing 11 in a fixed, dismantlable manner.

Compared with the second casing 11, the molding of the first casing 10 is more complex; therefore, if the groove 111 is disposed on the first casing 10, the machining difficulty of the first casing 10 will be increased, resulting in a higher rejection rate. To avoid this problem, the groove 111 is preferably disposed on the second casing 11.

Figure 4:
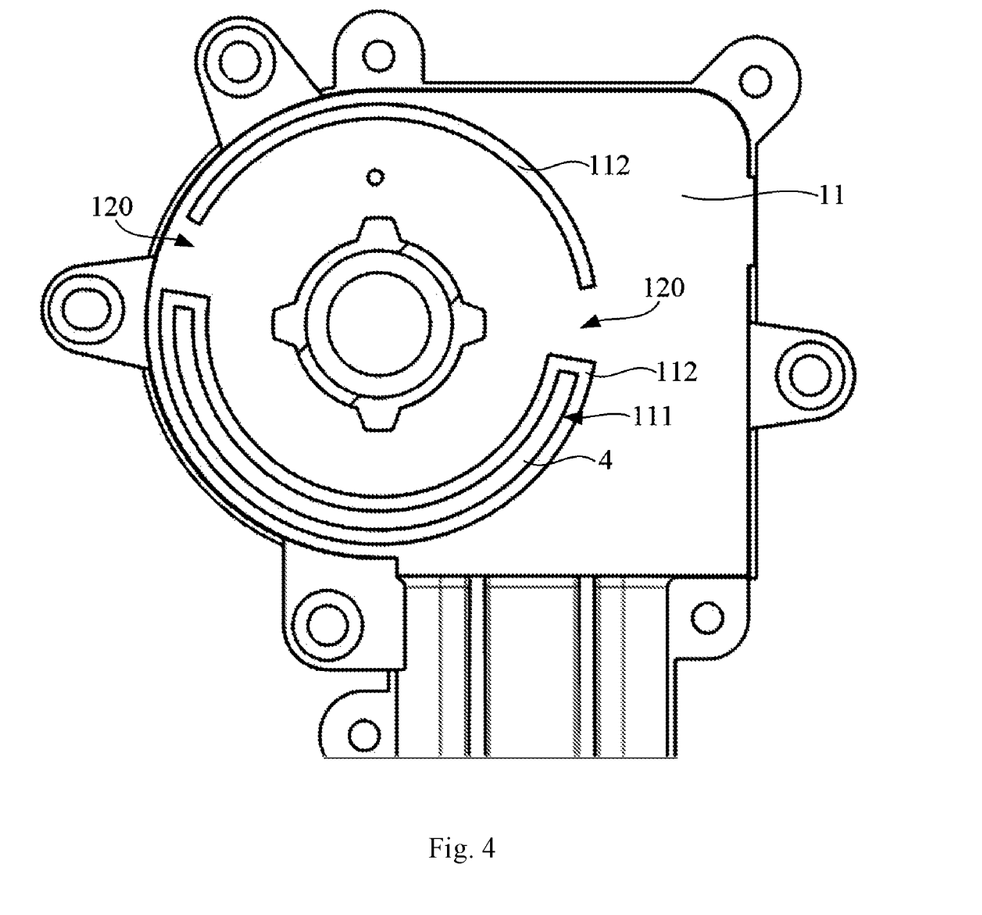
FIG. 4 is a side view of the second casing in the thermal management module shown in FIG. 1, viewed in the axial direction of the drive shaft.

As shown in FIGS. 2 and 4, in this embodiment, a surface of the second end cover 114 which faces the first casing 10 in the axial direction of the drive shaft 3 is provided with a boss 112 protruding in the axial direction; the boss 112 is in contact with the first end cover 102, so as to enclose the collecting cavity 12.

In this embodiment, there are two bosses 112, spaced apart in the circumferential direction of the drive shaft 3; a gap between the two bosses 112 forms an outlet 120 in communication with the atmosphere, and there are two outlets 120. In other words, the collecting cavity 12 is a non-closed cavity having outlets 120. Coolant collected in the collecting cavity 12 can, after evaporating, be discharged from the outlets 120; in this way, at the same time as the collecting cavity 12 collects leaked coolant, coolant in the collecting cavity 12 will be discharged to the outside of the housing 1, so that even after the thermal management module has been used for a period of time, the collecting cavity 12 can still have surplus space to continue collecting leaked coolant, avoiding the problem of sustained collecting of leaked coolant being impossible due to insufficient space in the collecting cavity 12.

In this embodiment, the groove 111 for mounting the seal 4 is disposed in one of the bosses 112. When the thermal management module is mounted in an environment of use, the boss 112 in which the seal 4 is mounted is located below the other boss 112 in which no seal 4 is mounted, such that coolant in the collecting cavity 12 is in contact with the boss 112 in which the seal 4 is mounted, but is not in contact with the boss 112 in which no seal 4 is mounted. Since the seal 4 is mounted in the lower boss 112, the sealing action of the seal 4 can prevent coolant from leaking from the position of contact between the lower boss 112 and the first casing 10.

In a variation of this embodiment, both bosses 112 are provided with grooves 111, and a seal 4 is mounted in each groove 111, such that seals 4 are disposed at both positions where the two bosses 112 on the second casing 11 are in contact with the first casing 10. In this way, when the thermal management module is mounted in an environment of use, the upper/lower relative positions of the two bosses 112 can be arranged arbitrarily.

In this embodiment, when viewed in the axial direction of the drive shaft 3, the shape of the seal 4 is adapted to the shape of the boss 112. Specifically, the seal 4 and the boss 112 are both circularly arcuate, the two bosses 112 are distributed on the same circumference, and the axial cross section of the collecting cavity 12 is circular. It must be explained that in the technical solution of the present invention, the shapes of the boss 112, the seal 4 and the collecting cavity 12 should not be restricted to this embodiment; for example, viewed in the axial direction of the drive shaft 3, the bosses 112 and the seal 4 could also be U-shaped, elliptically arcuate, etc.

In a variant of this embodiment, there may be a single boss 112, formed in the shape of a ring having a gap, the gap forming an outlet 120.

In another variant of this embodiment, a boss 112 is disposed on a surface of the first end cover 102 facing the second casing 11 in the axial direction of the drive shaft 3; the boss 112 is in contact with the second casing 11 so as to enclose the collecting cavity 12.

It must be explained that in the technical solution of the present invention, the way in which the first casing 10 and the second casing 11 enclose the collecting cavity 12 should not be restricted to the embodiment given; furthermore, the way in which the outlet 120 is constructed on the collecting cavity 12, and the way in which the seal 4 is disposed at the position of contact between the first casing 10 and the second casing 11, should also not be restricted to the embodiment given.

As shown in FIG. 2, in this embodiment, a first sealing ring 5 and a second sealing ring 6 spaced apart in the axial direction are provided around the drive shaft 3, wherein the first sealing ring 5 is used to prevent coolant in the first internal cavity 100 from leaking between the first end cover 102 and the drive shaft 3, and the second sealing ring 6 is used to prevent coolant from leaking between the second end cover 114 and the drive shaft 3 into the second internal cavity 113. When coolant in the first internal cavity 100 leaks out from the first sealing ring 5, the coolant is collected in the collecting cavity 12 directly.

In this embodiment, the drive apparatus in the second internal cavity 113 comprises an electric machine; an output end of the electric machine is connected to the axial end of the drive shaft 3 extending into the second internal cavity 113, such that torque outputted by the electric machine can be transferred to the drive shaft 3.

In a variation of this embodiment, the drive apparatus further comprises a gear speed reduction mechanism; the output end of the electric machine is connected to an input end of the gear speed reduction mechanism, and an output end of the gear speed reduction mechanism is connected to the axial end of the drive shaft 3 extending into the second internal cavity 113. In this way, torque outputted by the electric machine is transferred to the drive shaft 3 via the gear speed reduction mechanism. It must be explained that in the technical solution of the present invention, the structure of the drive apparatus should not be restricted to the embodiment given.

Although the present invention has been disclosed as above, the present invention is not limited to this. Any person skilled in the art could make various changes and amendments within the spirit and scope of the present invention, therefore the scope of protection of the present invention shall be the scope defined in the claims.

The invention claimed is:

1. A thermal management module, comprising: a drive shaft; a housing that receives the drive shaft, the housing having: a first internal cavity; a second internal cavity accommodating a drivetrain for driving the drive shaft to rotate; first and second casings arranged in sequence in the axial direction, the first and second casings being in dismantlable fixed connection with each other; the first internal cavity disposed within the first casing; and the second internal cavity disposed within the second casing; a partition that separates the first and second internal cavities, the partition having: a first end cover located on an axial side of the first internal cavity; a second end cover located on an axial side of the second internal cavity; the first and second end covers arranged opposite each other in the axial direction and enclosing a collecting cavity; a through-hole extending through the first and the second end covers for the drive shaft to pass through, the through-hole having: a first port disposed on the first end cover facing toward the first internal cavity; and, a second port disposed on the second end cover facing toward the second internal cavity; and, the first internal cavity, the partition, and the second internal cavity arranged in sequence in an axial direction of the drive shaft; the drive shaft having one axial end extending from the first port into the first internal cavity, and another axial end extending from the second port into the second internal cavity; and, the collecting cavity having: a collecting inlet provided as an aperture between the first and the second end covers; and, the collecting cavity used for collecting, through the collecting inlet, coolant in the first internal cavity which leaks from the first port.

2. The thermal management module of claim 1, wherein the collecting cavity includes an outlet configured for atmospheric communication.

3. The thermal management module of claim 1, further comprising a first sealing ring and second sealing ring disposed on the drive shaft, the first sealing ring preventing coolant from leaking between the first end cover and the drive shaft, and the second sealing ring preventing coolant from leaking between the second end cover and the drive shaft.

4. The thermal management module of claim 1, further comprising a seal disposed at a position of contact between the first and second end covers.

5. The thermal management module of claim 4, wherein the seal is a rubber seal.

6. The thermal management module of claim 1, wherein the dismantlable fixed connection is a bolt connection.

7. The thermal management module of claim 1, wherein one of the first or second end cover is provided with at least one protruding boss on a surface facing the other of the first or second end cover in the axial direction, the at least one protruding boss being in contact with the other of the first or second end cover to enclose the collecting cavity.

8. The thermal management module of claim 7, wherein the at least one protruding boss is configured to receive a seal.

9. The thermal management module of claim 7, wherein the at least one protruding boss is formed as a ring with a gap, the gap forming an outlet.

10. The thermal management module of claim 7, wherein the at least one protruding boss includes two protruding bosses spaced apart in a circumferential direction of the drive shaft.

11. The thermal management module of claim 10, wherein the two protruding bosses are circularly arcuate.

12. The thermal management module of claim 11, wherein one of the first or second end cover is provided with a groove configured to receive a first part of a seal, a second part of the seal protruding from the groove and forming a contact seal with the other of the first or second end cover.

13. The thermal management module of claim 10, wherein the two protruding bosses form at least one outlet.

14. The thermal management module of claim 13, wherein the at least one outlet is configured for atmospheric communication.

15. The thermal management module of claim 10, wherein the two protruding bosses include a first upper boss and a second lower boss, the second lower boss configured to receive a seal.

16. A thermal management module, comprising: a drive shaft; a housing that receives the drive shaft, the housing having: a first internal cavity; a second internal cavity accommodating a drivetrain for driving the drive shaft to rotate; first and second casings arranged in sequence in the axial direction, the first and second casings being in dismantlable fixed connection with each other; the first internal cavity disposed within the first casing; and the second internal cavity disposed within the second casing; a partition that separates the first and second internal cavities, the partition having: a first end cover located on an axial side of the first internal cavity; a second end cover located on an axial side of the second internal cavity; the first and second end covers arranged opposite each other in the axial direction and enclosing a collecting cavity; a through-hole extending through the first and the second end covers for the drive shaft to pass through, the first internal cavity, the partition, and the second internal cavity arranged in sequence in an axial direction of the drive shaft; and, the collecting cavity located between the first and second internal cavities, the collecting cavity having a collecting inlet provided as an aperture between the first and the second end covers; and, the collecting cavity configured to collect coolant which leaks from the first internal cavity.

17. The thermal management module of claim 16, further comprising a valve body connected to the drive shaft, wherein a flow of fluid is controlled by a rotational position of the valve body.

\* \* \* \* \*